Nov. 4, 1952     O. E. ALLEN     2,616,739
REMOTE-CONTROLLED LATCHING DEVICE
Filed July 21, 1949     2 SHEETS—SHEET 1
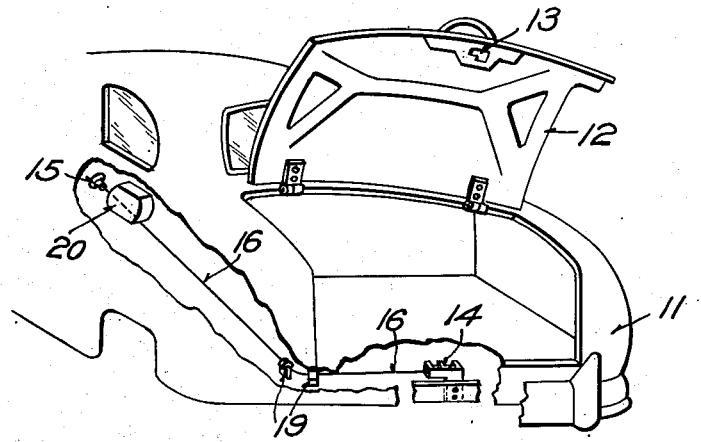
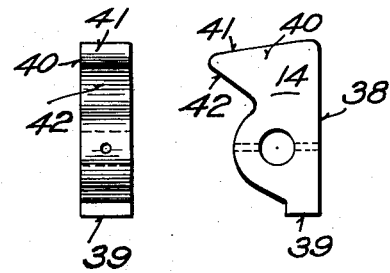
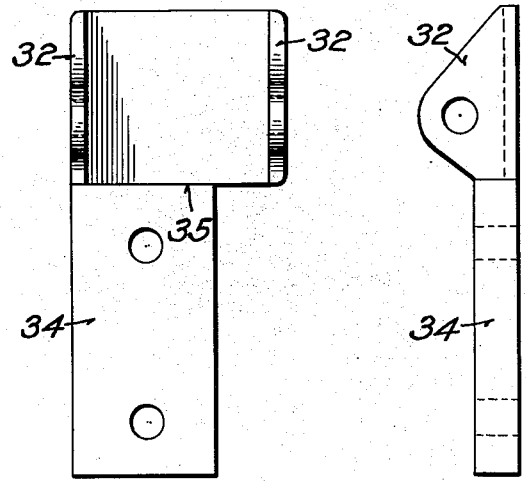
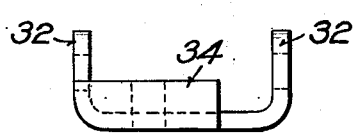
INVENTOR.
ORVAL E. ALLEN,
BY
*H. B. Willson & Co.*
ATTORNEYS Nov. 4, 1952    O. E. ALLEN    2,616,739
REMOTE-CONTROLLED LATCHING DEVICE
Filed July 21, 1949    2 SHEETS—SHEET 2
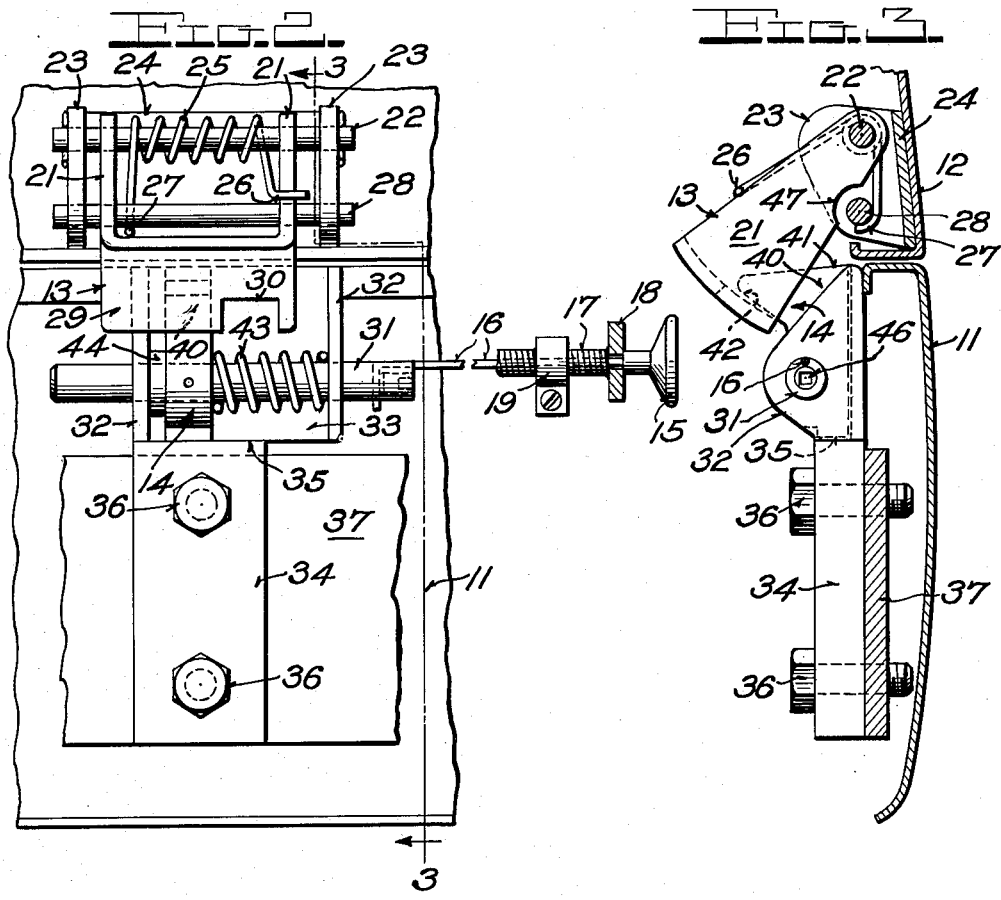
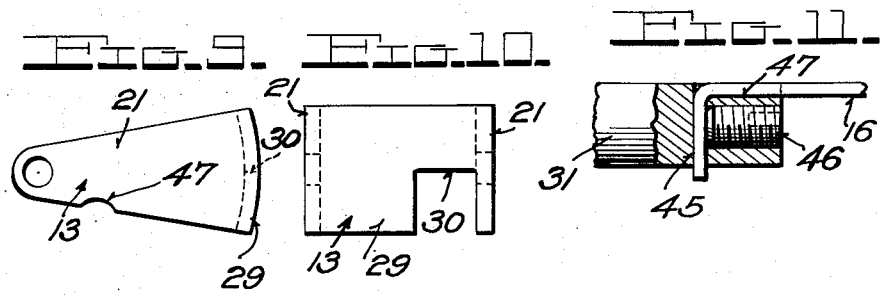
INVENTOR.
ORVAL E. ALLEN,
BY
H. B. Willson & Co.
ATTORNEYS Patented Nov. 4, 1952

2,616,739

UNITED STATES PATENT OFFICE 2,616,739

REMOTE-CONTROLLED LATCHING DEVICE

Orval E. Allen, Dugger, Ind.

Application July 21, 1949, Serial No. 106,038

5 Claims. (Cl. 292—171)

This invention relates to remote-controlled locking or latching devices for the swinging covers of the compartments of automobiles such as the deck lid of the luggage compartment and the engine hood.

The primary object of the invention is to eliminate the usual key-operated handle locks on automobile trunk or deck lids and the more complicated and expensive remote-control assemblies now in use on such lids or covers.

Another object is to provide a very simple and inexpensive lid latching or locking device which may be released by the operation of a button or finger-piece on the inside of the car within convenient reach of a person on the driver's seat and which will do away with the necessity of employing a spring to lift the lid to separate the latch parts or of employing a supplemental latching means that must be manually actuated from the exterior of the automobile after the remote control latching means is released.

A further object is to provide a lock or latch release of this character having a shiftable strike-plate which coacts with a vertically swinging latch on the lid and is spring actuated to its locking position but which when manually moved to a latch-releasing position will be held in such released position by the latch itself until the lid is opened or until a sudden jar or bump of the car on the road causes the latch to release the strike-plate and permit its spring to move it into locking relation with the latch.

With the above and other objects in view the invention resides in the novel combinations and arrangements of parts and in the novel features of construction hereinafter fully described and illustrated, in the present preferred form, in the accompanying drawings, in which:

Fig. 1 is a diagrammatic perspective view of parts of the rear portion of an automobile showing the application of the invention, the deck lid of the trunk or luggage compartment being in an open position, Fig. 2 is a front elevation of the lid locking and releasing mechanism applied to the interior portions of the lid and body of the automobile, the parts being in locked position and the operating button and associated parts being diagrammatically shown, Fig. 3 is a vertical front to rear section taken substantially on the line 3—3 of Fig. 2, Figs. 4 and 5 are respectively front and side views of the mounting bracket for the strike-plate, Figs. 6 and 7 are respectively front and side views of the strike-plate, Fig. 8 is a bottom view of the bracket shown in Figs. 4 and 5, Figs. 9 and 10 are respectively side and front views of the swinging latch, and Fig. 11 is a detail section showing the manner of fastening the pull wire to a slidable pin which carries the strike-plate.

In Figs. 1, 2 and 3 the numeral 11 designates the outer metal body of the automobile and 12 the usual vertically swinging hinged deck lid that closes the trunk or luggage compartment in the rear of the body. As shown more clearly in Figs. 2 and 3, the lid or cover member 12 carries on its inner side a pivoted, spring actuated latching or locking member 13 which coacts with a relatively fixed but laterally shiftable strike-plate 14 positioned at the center of the inner side of the lower portion of the body 11 to lock the lid in its lowered or closed position. The strike-plate is spring pressed to its locking position in which it lies in the path of movement of a solid portion of the latch as the deck lid swings to its closed position so that the latch may snap into locking engagement with it. At one side of such solid portion of the latch is a notch opposite which the strike-plate may be slid to free the latch and unlock the lid so that it may be lifted to open position by means of a suitable fixed handle shown in Fig. 1. The sliding or lateral movement of the strike-plate is caused by pulling on a button or fingerpiece 15 suitably connected to it by a pull wire, cable, chain or the like 16, the button being located within the car body and preferably within reach of the driver. The flexible pull connection 16 is preferably a Bowden wire within a flexible sheath or tube 17 having one end secured to a suitable bracket 18 which serves as a stop for the fingerpiece 15. Suitable clamps 19 are secured at spaced points to the automobile body or frame to hold the sheath as indicated in Fig. 1. In the latter the operating button 15 is shown as being located adjacent to the arm rest 20 for the rear seat on the driver's side of the car, but it may be on the dash or instrument board, or at any convenient location within the car.

The latch 13 is preferably U-shaped and has its two arms 21 fixed to a horizontally disposed pivot pin 22 whose axis is parallel with the pivotal axis of the hinge for the lid 12 so that the latch also swings vertically. The pin is rotatable in bearing openings in the upper portions of two spaced arms 23 on a bracket plate 24 suitably secured to the inner or under-face of the lid or closure member 12. A coiled torsion spring 25 surrounds the pin or pivot between the arms 21 and has one end 26 thrusting against one of the arms 21 and its other end 27 thrusting against a stop pin 28 suitably fixed in alined openings in the lower portion of the bracket arms 23. The latch is thus mounted for vertical swinging and is preferably urged downwardly by the spring. The cross portion of the latch 13 has a solid portion 29 which forms a transverse shoulder and a notch 30 is formed in its lower edge at one end of the portion 29 as seen in Figs. 2 and 10. The wall of the notch at the end of the portion 29 forms a second shoulder disposed at right angles to the transverse shoulder.

The striker or strike-plate 14 which serves as a keeper for the latch, is mounted for horizontal sliding movement transversely to the path of swinging movement of the latch. It is suitably fixed to a pull pin 31 which extends through and is slidable in alined openings in the spaced arms 32 of a U-shaped bracket plate 33 suitably fixed to the automobile body within the luggage or other compartment closed by the lid or cover 12. The manner of attachment of the bracket plate 33 will vary according to the automobile structure, but as shown said plate is formed with a depending thickened attaching portion 34 which provides a horizontal shoulder 35. The attaching portion 34 is shown as formed with openings to receive machine screws, bolts or other fastenings 36 for securing the bracket to a transverse frame or body bar 37 on the inside of the outer body part 11. The strike-plate 14 has one flat edge 38 in sliding contact with the intermediate portion of the bracket plate 33 and a flat lower end 39 slidably engaged with the shoulder 35. For the sake of clearness the edge 38 and the opposed contacting face of the web portion of the channel plate 33 are shown in Fig. 3 by separate dotted lines. At the other side of the striker at its top is formed a V-shaped projection 40 having converging and inclined faces 41 and 42 which coact with the latch 13 as hereinafter explained. A coiled compression spring 43 surrounds the pin 31 and at one end thrusts against one of the arms 32 while its other end thrusts against one of the flat sides of the strike-plate to urge it against a sound-deadening or cushioning washer 44 on the pin and in contact with the other arm 32. The cable, wire or other flexible connection 16 may be attached to one end of the pull pin 31 as shown in Fig. 11 by bending the end of the wire at right angles and inserting it in a transverse hole 45 in the pin. A set screw 46 in the end of the pin clamps the wire and if desired a longitudinal groove 47 may be formed in the side of the pin to receive a portion of the wire 16.

It will be seen that the parts are so constructed and arranged that when the striker is in its normal or latch-locking position shown in Figs. 2 and 3, it will be in the path of movement of the transverse shoulder formed by the solid portion 29 of the latch; and when the lid 12 is swung to its closed position, the latch will strike and move along the inclined face 41 until spring 25 snaps the shoulder 29 into engagement with the face 42, thus locking the lid closed. When the occupant of the car desires to release the latch the button 15 is pulled to shift the strike-plate laterally to a retracted position against the tension of the spring 43 to bring the V-shaped portion 40 opposite the notch 30, thereupon the spring 25 swings the latch slightly further in a downward direction so that the projection 40 is disposed in the notch 30. When the button 15 is released, the striker will be retained in its retracted or unlocked position since the spring 43 will thrust one side of the projection 40 against the shoulder formed by one wall of the notch. When the parts are thus positioned the lid remains closed but not latched. When the lid is thus unlocked it may be readily raised to an open position whereupon the spring 43 will shift the striker to its normal position in the path of movement of the transverse shoulder 29 of the latch. Should the device be left in its released or unlocked position, the bumping of the car on the road will cause the vertically swinging latch to release the striker by the shoulder formed by the end wall of the notch moving off of the projection 40, thus allowing the striker to move to its latch locking position. The device is therefor automatic or self locking when the car is in motion. If desired the arms 21 of the latch may be formed with notches 47 to receive the stop pin 28 and limit the extreme downwardly swinging of the latch under the action of spring 25. It will be understood that even when the latch is held by the spring 25 against the stop 28 and the striker is in retracted position with its projection 40 thrusting against the shoulder formed by the wall of the notch 30, the jarring or bouncing of the vehicle when it is in motion will cause the trunk or deck lid 12 to have a slight vertical motion due to its weight and the latch will move with it. Such motion is sufficient to move the latch downwardly off the said shoulder and thus automatically release the striker. The tension of the latch spring 25 is such that the lid will lock when it is dropped or lowered to its closed position.

It will be noted that the device has few and simple parts which may be manufactured and installed at small expense, and that it will do away with more complicated and expensive devices for accomplishing the remote control of lid latching means.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. Remote controlled latching means for releasably securing a vertically swinging, compartment lid to its support on an automobile or other road vehicle, comprising a latch carried by the lid and pivotally mounted on a horizontal axis to swing downwardly therefrom, a striker carried by the support and mounted for horizontal sliding movement in a direction parallel with the pivotal axis of the latch and transversely to the path of its swinging movement, from a normal latch-holding position to a retracted latch-releasing position, said striker having a latch engaging projection, said latch having two right angularly disposed shoulders to be engaged successively with said projection, one shoulder extending transversely to the path of swinging movement of the latch and the second shoulder being disposed at one end of the transverse shoulder, the pivotal mounting of the latch causing the transverse shoulder to swing into locking engagement with said projection when the lid is swung to closed position while the striker is in its normal position, said projection limiting the downward swinging of the latch and holding it in lid-locking position while said transverse shoulder is in engagement with said projection, spring means urging said striker to its normal position, and pull means connected to the striker to slide it against the tension of said spring means to move said projection off of said transverse shoulder, thereby permitting further downward swinging of the latch to move its second shoulder into the path of sliding movement of said projection, whereby when said operating means is released after having moved the striker to its retracted position, the tension of said spring means will thrust said projection against said second shoulder to hold the striker in latch-released position.

2. The remote controlled latching means of claim 1 together with spring means for yieldably urging said latch in a downward direction, and positive stop means for limiting the extreme downward swinging movement of said latch on its pivotal axis.

3. The remote controlled latching means of claim 2 in which said latch is U-shaped having two arms connected by a cross portion, the two arms being inclined downwardly from said horizontal axis and the cross portion being formed in its lower edge with a notch, one wall of the notch forming said second shoulder and the adjacent part of said cross portion forming said transverse shoulder.

4. Remote controlled latching means for releasably securing a vertically swinging, compartment lid to its support on an automobile or other road vehicle, comprising latch and striker portions, one carried by the lid and the other by the support, the latch portion being mounted at one end for vertical swinging movement about a horizontal axis and having at its free end two right angularly disposed shoulders, one extending transversely to the path of swinging movement of the latch portion and the second being disposed at one end of the transverse shoulder, spring means for yieldably urging said latch portion in one direction, said striker portion having a V-shaped projection for coaction with said latch portion and being mounted for sliding movement in a horizontal direction parallel with the pivotal axis of the latch portion and transversely to its path of swinging movement, said striker portion being movable from a normal position in which said projection is disposed in the path of movement of said transverse shoulder to limit the swinging movement of the latch portion under the action of said spring means when its transverse shoulder engages said projection to hold the latch portion in lid-locking position, to a retracted position in which said projection is moved off of said transverse shoulder to permit said latch portion to have further swinging movement under the action of said spring means to move said second shoulder into the path of sliding movement of the projection, spring means for yieldably urging said striker portion to its normal position, and pull means for operating said striker portion to its retracted position against the tension of the last mentioned spring means, whereby when said pull means is released after it has moved the striker portion to its retracted position, said striker portion will be prevented from returning to its normal latch-holding position.

5. The remote controlled latching means of claim 4 in which said latch portion is U-shaped having two arms connected by a cross portion, the two arms swinging about said horizontal axis and the cross portion having a notch in one edge, one wall of the notch forming said second shoulder and the adjacent part of said cross portion forming said transverse shoulder.

ORVAL E. ALLEN.

REFERENCES CITED

The following references are of record in the file of this patent:

UNITED STATES PATENTS

| Number | Name | Date |
|---|---|---|
| 1,221,799 | Holtzman | Apr. 3, 1917 |
| 2,126,141 | Saunders | Aug. 9, 1938 |
| 2,145,968 | Bozarth | Feb. 7, 1939 |